United States Patent Office 2,874,034
Patented Feb. 17, 1959

2,874,034
GRINDING TOOL FORMED OF AN INORGANIC BONDING AGENT

George August Rieke, Chicago, Ill.

No Drawing. Continuation of application Serial No. 226,950, May 17, 1951. This application August 10, 1954, Serial No. 449,021

6 Claims. (Cl. 51—298)

This invention relates to compositions of matter for use as an abrasive or grinding tool in the process or tool industry and it relates more particularly to the manufacture of grinding wheels or tools fabricated of an inorganic abrasive in finely divided form bonded into a composite structure with an infusible and insoluble organic bonding agent.

This application is a continuation of applicant's copending application Ser. No. 226,950, filed May 17, 1951, and now abandoned.

Wheels and tools of the type described are generally manufactured by incorporating the abrasive in finely divided form with an adhesive in an intermediate stage of polymeric growth to form a compound which may be molded under heat and pressure or reacted by a catalyst while the compound is formed to desired shape to advance the adhesive to a cured or set stage and impart a permanent bonded relation to the formed composite product. In systems of the type described, the bonding agent may be a thermosetting resinous material of the type phenol formaldehyde which is capable of advancement by thermal reaction with or without catalyst to the infusible and insoluble stage. Suitable phenol formaldehyde resinoids of the type described may be prepared in accordance with the teachings of Patents Nos. 1,503,392, 1,537,454 and 2,010,873. Instead, the bonding agent may be selected of a melamine formaldehyde or urea formaldehyde which is a resinous material of the thermosetting type. Very often, the bonding agent used in wheels of the type described are compounded of a rubber, natural or synthetic, vulcanized during the molding operation in the presence of an accelerator and vulcanizing agent to the infusible and insoluble cured stage.

It has been found that the properties of wheels or tools of the type described embodying inorganic abrasive particles integrated with an organic cured bonding resin or rubber may be markedly improved by the incorporation of relatively small amounts of a finely divided, expanded micaceous mineral.

When a curable resinous bonding agent, such as phenol formaldehyde, urea formaldehyde, melamine formaldehyde or the like is employed as the bonding agent, the amount of the resinoid may range from 5–50 parts by weight to 95–50 parts by weight of the inorganic abrasive. If the resinoid is based upon shellac capable of reaction under heat and pressure to a hardened stage, the shellac component may be present in an amount ranging from 15–75 parts by weight to 85–25 parts by weight of the inorganic abrasive. When the bonding agent is formed of a vulcanizable or curable rubber base, the amount thereof may range from 15–75 parts by weight of the rubber base to 85–25 parts by weight of the abrasive.

With either type of organic bonding agent, improved properties, such as permissible use of higher cutting speeds of the tool, less wear and correspondingly longer useful life, and the maintenance of a constant sharp cutting edge or constant generation of a sharp cutting edge is secured when the expanded micaceous mineral is present in an amount ranging from 5–25 percent by weight based upon the amount of organic bonding agent. It is preferable, however, to have the expanded micaceous mineral in finely divided form present in the lower range within the range described, such as in an amount ranging from 5–15 percent by weight of the organic binder.

The expanded micaceous mineral may be selected from a number of micaceous substances, such as vermiculite, jeffersite, kervite, wilcoxite and the like, and it is preferred to make use of expanded vermiculite, such as is believed to be formed during alteration of biotite and phlogopite, and is usually found in association with the basic rock such as dunite, serpentine and the like. The processes for expanding micaceous mineral forms no part of this invention and a reference therefore may be made to Patent No. 1,922,448, granted on August 15, 1933, and Patent No. 1,963,276, granted on June 19, 1934, to Carl S. Miner.

By way of illustration, but not by way of limitation, the following sets forth a representative analysis of an expanded micaceous mineral which represents a substance which may be used in the practice of this invention:

Chemical analysis:
| | |
|---|---|
| $SiO_2$ | 37.8 |
| Carbon | .08 |
| Zinc | 0 |
| $Fe_2O_3$ | 16.65 |
| $Nu_2O_3$ | 11.1 |
| $TiO_2$ | 1.05 |
| CaO | .75 |
| MgO | 3.85 |
| $K_2O.Na_2O$ | 5.2 |
| Ignition loss | 23.6 |

From the theoretical standpoint, the function of expanded micaceous mineral in the composite product is not well understood. By way of measuring the contribution of the micaceous substance in the properties of the final product, it is apparent from the results secured that the ability to resist deterioration at higher temperature generally developed in the grinding tool as an incidence to normal use is considerably increased and that the product appears to be vastly tougher and harder to the extent that higher cutting speeds can be used with less wear of the tool or wheel thereby to improve the efficiency as well as the useful life of the tool. It appears also that the cutting edge of the tool is constantly maintained in response to the development of heat during use of an order to melt away sufficient bond to expose a new cutting edge as the need arises. It is for this reason that it is preferred to limit the amount of expanded micaceous mineral to within the lower area of the preferred range, otherwise the low heat conductivity of the mineral will handicap this desirable effect. There is reason to believe that the expanded micaceous mineral functions in addition as a catalytic agent for the condensation reaction in the conversion of the resinoid to a cured stage at elevated temperatures. More important, however, it appears that the micaceous mineral in finely divided form permits elimination of all or part of the accelerator required for vulcanization of the rubber base adhesive thereby to improve the suitability of the wheel produced therefrom for grinding metal surfaces and cutting edges. Corresponding results have not been secured by micaceous minerals of the type described which have not been expanded. Some of the reasons for the inability of micaceous minerals which have not been expanded to function in accordance with the practice of this invention may result by reason of the fact that such minerals possess abrasive substances, such as aluminum oxide, which is eliminated during expansion and during expansion the particles are converted to a relatively inert state wherein the melting point temperature is more than doubled and the particles are converted to a soft and greasy feel which may cause them to function as plasicizers which strengthen instead of weaken the bonding agent.

The following examples illustrate compositions which may be used in the practice of this invention:

*Example 1*

5 percent expanded mica in finely divided form.
25 percent phenol formaldehyde (B stage)
70 percent silicon carbide

*Example 2*

6 percent expanded mica
40 percent phenol formaldehyde resin in an intermediate stage of polymeric growth
54 percent Carborundum

*Example 3*

3 percent expanded vermiculite
30 percent melamine formaldehyde resin in a curable stage
67 percent Carborundum

*Example 4*

5 percent expanded mica
50 percent shellac
45 percent zircon

*Example 5*

8 percent expanded mica
35 percent rubber base
3 percent sulphur
.2 percent accelerator
51.8 percent Carborundum The resinous or rubber base materials in the proportions set forth in the above examples may be mixed with the abrasive in finely divided form and the expanded mica and molded under heat and pressure to the desired shape. At the elevated temperatures of molding the bonding agent passes through an adhesive stage prior to conversion to an infusible and insoluble stage whereby the elements become bonded together into a composite mass having mold shape. For the phenol formaldehyde resinoid cure may be carried out at temperatures ranging from 250–450° F. under pressures ranging from 50–5000 pounds per square inch. Slightly lower temperatures may be used for the melamine formaldehyde or for the conversion of the rubber to the cured stage.

It will be understood that other inorganic abrasives in finely divided form may be substituted in whole or in part for those described, such for example as silica, aluminum oxide and the like particles generally employed in the abrasive field. It will be further understood that other resinoids might also be used and that numerous changes may be made in the ratios in which the materials are present and their method of handling without departing from the spirit of the invention, especially as defined in the following claims.

I claim:

1. An abrasive grinding wheel consisting essentially of 95–50 parts by weight of inorganic abrasive material in finely divided form bonded into a composite mass with a thermosetting organic binder in a cured stage present in an amount within the range of 5–50 parts by weight and selected from the group consisting of phenol formaldehyde, urea formaldehyde, melamine formaldehyde, shellac and rubber and an expanded micaceous mineral in finely divided form distributed therein and present in an amount ranging from 5–25 parts by weight based upon the amount of organic bonding agent.

2. An abrasive grinding wheel consisting essentially of 95–50 parts by weight of a finely divided inorganic abrasive imbedded in uniform distribution within 5–50 parts by weight of a cured phenol formaldehyde resin and an expanded micaceous mineral in finely divided form present in an amount ranging from 5–15 percent by weight of the phenol formaldehyde resin.

3. An abrasive grinding wheel consisting essentially of 85–25 parts by weight of an inorganic abrasive material in finely divided form imbedded in uniform distribution within 15–75 parts by weight of a cured rubber, and an expanded micaceous mineral in finely divided form present in an amount ranging from 5–15 percent by weight of the rubber base.

4. An abrasive grinding wheel consisting essentially of 85–25 parts by weight of an inorganic abrasive material in finely divided form imbedded in uniform distribution within 15–75 parts by weight of a cured shellac, and an expanded micaceous mineral in finely divided form present in an amount ranging from 5–15 percent by weight of the shellac base.

5. An abrasive grinding wheel as claimed in claim 1 in which the abrasive particles comprises silicon carbide.

6. An abrasive grinding wheel as claimed in claim 1 in which the expanded micaceous mineral introduced comprises vermiculite having a particle size distribution of

|  | Percent |
|---|---|
| Larger than .05 mm | 0 |
| .05–.005 | 38 |
| .005–.001 | 49 |
| .001—smaller | 13 |

References Cited in the file of this patent

UNITED STATES PATENTS

| 1,976,946 | Klieforth | Oct. 16, 1934 |
| 2,393,874 | Trent | Jan. 29, 1946 |
| 2,469,398 | Meyer | May 10, 1949 |
| 2,610,960 | Nordlander | Sept. 16, 1952 |

FOREIGN PATENTS

| 44,410 | France | Jan. 19, 1935 |
| 509,655 | Great Britain | July 19, 1939 |